United States Patent [19]

Madden

[11] Patent Number: 4,622,821

[45] Date of Patent: Nov. 18, 1986

[54] COMBUSTION LINER FOR A GAS TURBINE ENGINE

[75] Inventor: Thomas J. Madden, Vernon, Conn.

[73] Assignee: United Technologies Corporation, Hartford, Conn.

[21] Appl. No.: 689,253

[22] Filed: Jan. 7, 1985

[51] Int. Cl.[4] .......................... F02C 1/00; F02G 3/00
[52] U.S. Cl. ........................................ 60/757; 60/755
[58] Field of Search ................. 60/752, 755, 757, 759, 60/756, 758, 760; 431/351, 352

[56] References Cited

U.S. PATENT DOCUMENTS

| 2,699,648 | 1/1955 | Berkey | 431/352 |
| 3,656,297 | 4/1972 | Monk | 60/755 |
| 3,899,876 | 8/1975 | Williamson | 431/352 |
| 4,132,066 | 1/1979 | Austin, Jr. et al. | 60/752 |
| 4,361,010 | 11/1982 | Tanrikut et al. | 60/757 |
| 4,380,906 | 4/1983 | Dierberger | 60/757 |
| 4,549,402 | 10/1985 | Saintsbury et al. | 60/760 |

FOREIGN PATENT DOCUMENTS

| 2932318 | 2/1981 | Fed. Rep. of Germany | 60/757 |
| 1289128 | 9/1972 | United Kingdom | 60/755 |

*Primary Examiner*—Louis J. Casaregola
*Assistant Examiner*—Timothy S. Thorpe
*Attorney, Agent, or Firm*—Norman Friedland

[57] ABSTRACT

The liner of a combustor for a gas turbine engine is constructed to include a refilmer at the combustion/dilution air holes so as to form a film of cool air along the inner surface of the liner in the combustion, that would otherwise be destroyed by the combustion/dilution air.

6 Claims, 5 Drawing Figures

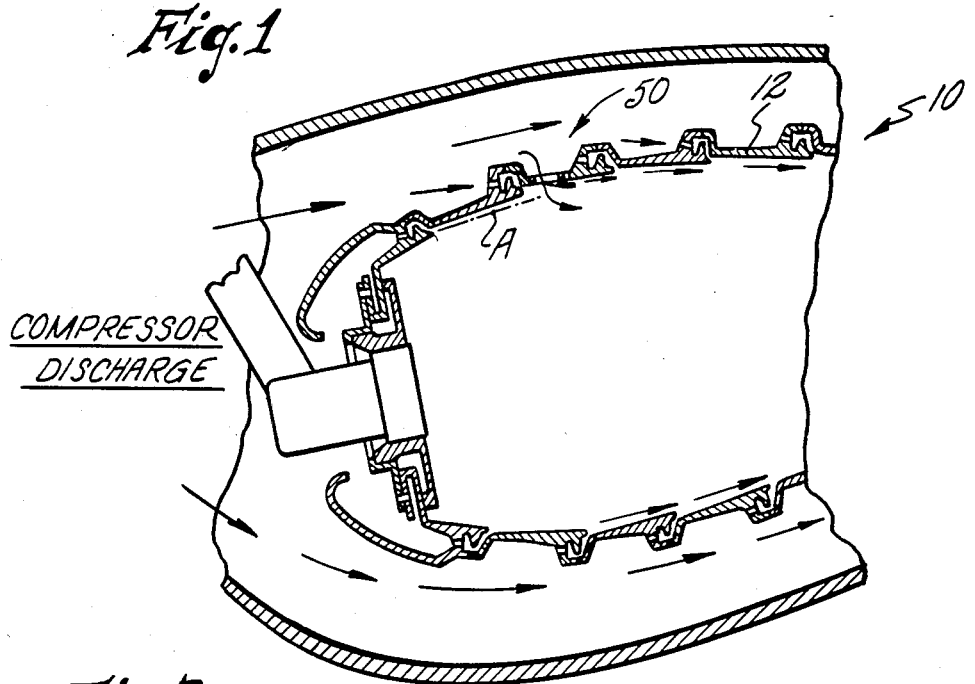
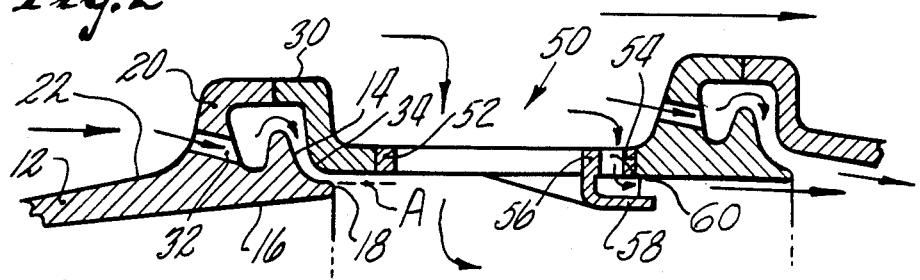
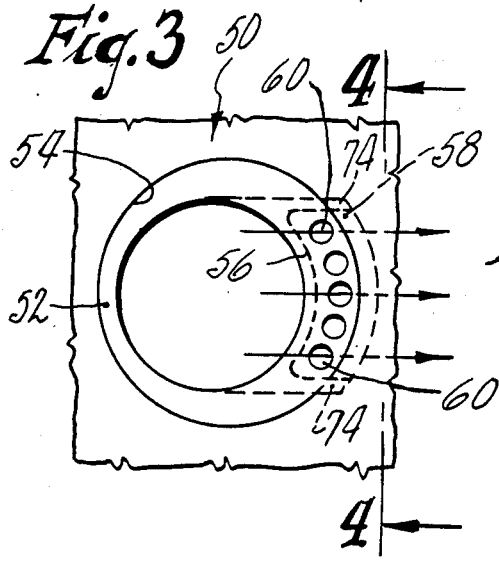
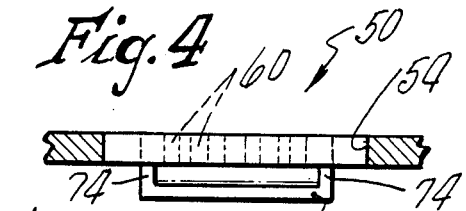
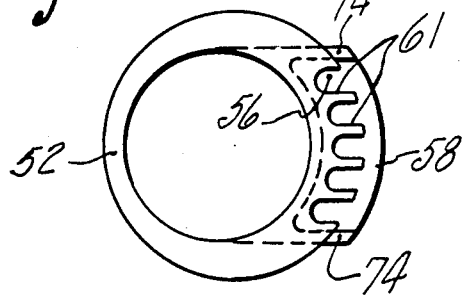

COMBUSTION LINER FOR A GAS TURBINE ENGINE

CROSS REFERENCE

This invention is related to the inventions disclosed in copending patent applications Ser. Nos. 689,218 and 682,220, both pending, entitled INTEGRAL REFILMER LIP FOR FLOATWALL PANELS, and COMBUSTORS, filed by Harold G. Reynolds and Robert C. Fucci, respectively on even date and both assigned to the same assignee of this application.

DESCRIPTION

1. Technical Field

This invention relates to gas turbine engine combustors and particularly the dilution and combustion air holes in the lining of the combustor.

2. Background Art

This invention is directed to means for improving the durability of a combustor liner of a gas turbine engine by providing a cooling film downstream of combustion/dilution air holes for fabricated structures which utilize film coolant. Functionally, this film regenerator reduces the combustor liner temperature downstream of the air holes similar to the system disclosed in U.S. Pat. No. 4,132,066 granted to G. W. Austin, R. A. Breton, J. J. Nolan and E. Striebel on Jan. 2, 1979; however, the method of cooling introduction by the inventions and the method of cooling the liners are different. The reference patent was required for liners fabricated from Finwall material which patent is assigned to the same assignee as this patent application. As evident in the aforementioned patent, grommets are used while in others the sheet metal walls are bent inwardly toward the flow passages. In either event, the flow adjacent the upstream side of the dilution and combustion air holes is dammed and consequently, starving the downstream side of these holes. The patent teaches how to solve that problem by introducing air on the downstream side of these holes.

However, in combustion liners made from material other than Finwall material, the problem is not with the disruption of the cooling air flow but rather with the adverse affect the dilution and combustion air has on the cooling film generated by the liner. For example, U.S. Pat. No. 4,380,906 granted to J. A. Dierberger on Apr. 26, 1983 and likewise assigned to the same assignee as this patent application shows a double pass louver liner that serves to generate a cooling film adjacent the lower surface on the hot side of the liner (in the combustion zone). In fact, in its preferred embodiment this invention serves to alleviate the problem caused by the combustion and dilution air holes in this particular linear.

Another prior art construction is exemplified in U.S. Pat. No. 4,302,941 entitled "Combustor Liner Construction For Gas Turbine Engine" granted to T. L. DuBell on Dec. 1, 1981 and assigned to the same assignee as the present patent application. As noted, the refilmer is utilized in a Floatwall liner construction and is located at the bend of the outer shell at the point where the adjacent segments are aligned. The air fed to the refilming lip is through the middle passageway. As noted from this configuration, the impingement air is not taken from the outer surface of the liner or the shroud that encapsulates the liner, and that the opening is subjected to change inasmuch as the segmented panel moves circumferentially and axially.

3. Disclosure of Invention

This invention contemplates the use of a grommet that carries a lip formed on the downstream side relative to the flow of the engine's working medium extending radially inwardly toward the combustion zone and axially in an upstream and downstream direction. The lip defines an impingement surface for receiving cooling air from outside of the liner (cool side) through holes or slots formed downstream of the combustion or dilution air holes, as the case may be, so as to form a cooling film on the hot side of the liner surface to replace the one that was impaired by the air passing through the combustion or dilution air holes. The combustion or dilution hole may be formed in the grommet itself or the combustion liner and the impingement air holes for the lip may likewise be formed in the grommet or liner itself.

By actual usage, this invention not only serves to reduce combustor temperature downstream of the combustion and dilution air holes, but also decreases the probability of cracks propagating from these holes because of the increased cross section. The invention also has been found to increase the discharge coefficient of the combustion and dilution air holes with a consequential improvement in the jet penetration of the air passing through these holes.

The grommets provide a simple means to modify the combustion air and dilution air holes, which are relatively inexpensive, while at the same time serve to facilitate the assembly thereof because they are readily adapted to be welded by automated means in the combustor liner, and further, they can be easily tailored to a particular linear configuration which inherently keeps development costs to a minimum.

The object of this invention is to provide for a combustor liner of a gas turbine engine improved durability by augmenting the cooling film downstream. A feature of this invention is to provide a downstream extending lip on the combustion side of the liner adjacent the combustion or dilution air holes which includes an impingement surface to redefine a cooling film adjacent the hot surface of the liner. The apertures (holes or slots) providing the access for impingement on the lip may be formed in a grommet or in the combustor liner. The hole for combustion air or dilution air may also be formed in the grommet or the combustor liner.

Other features and advantages will be apparent from the specification and claims and from the accompanying drawings which illustrate an embodiment of the invention.

BRIEF DESCRIPTION OF DRAWINGS

FIG. 1 is a partial view in cross section and partly in elevation shown the combustor incorporating this inventio.

FIG. 2 is an enlarged partial view in section showing the details of this invention.

FIG. 3 is a sectional view of the grommet attached to the louver liner partially shown in phantom where the combustion/dilution hole is formed therein.

FIG. 4 is a plan view of the grommet of FIG. 3, and

FIG. 5 is a sectional view taken along lines 5—5 of FIG. 4.

BEST MODE FOR CARRYING OUT THE INVENTION

While this invention is shown in its preferred embodiment being incorporated into the liner of an annular burner for a gas turbine engine, it should be understood that the invention has application for other types of louver liners as, say, for the can type. For a better understanding of gas turbine engine combustors, reference should be made to the aforementioned patents and the combustors for the JT8D, JT9D, PW2037 and PW4000 engine models manufactured by Pratt & Whitney Aircraft Group, division of United Technologies Corporation, the assignee of this patent application.

Referring to FIGS. 1 and 2, the annular burner generally indicated by reference numeral 10 is suitably supported in a gas turbine engine for housing the heat generating mechanism of the engine. As is well known, combustion of the fuel ensues therein for developing sufficient energy to drive the turbine and develop horsepower or thrust depending on whether it is a turboprop engine or a jet engine.

The burner comprises a plurality of louvers constructed cylindrical or conical members 12 mounted end in a lengthwise manner defining a hollow combustion chamber. The end of each louver carries a lip-like portion that serves to generate a cooling film for cooling the adjacent wall of the liner.

The cooling scheme is best illustrated by referring to FIG. 2 which is an enlarged portion of a typical louver.

As can be seen from FIG. 2, which is the preferred embodiment, but this invention would be equally applicable to other combustor constructions, the fin 14 depends from the hot wall portion 16 of louver member 12 and is disposed between lip 18 and the inlet flange 20. As noted, the lip 18, the fin 14 and flange 20 are circular in shape and may be fabricated by being machined or rolled. Fin 14 serves a dual function (1) of supporting the lip which eliminates the need for supporting posts as required in some prior art combustors and (2) turning the air.

A section 30 of the louver 12 is bent to form a closure of the film cooling section and confines the cooling airflow so that compressor discharge air is admitted internally thereof through a plurality of inlet openings 32 which is dimensioned and located to effectively impinge on the fore face of fin 14. In this configuration inlets 32 see the total pressure of compressor discharge pressure. The internal configuration causes the air to turn and flow around the fin washing the underside of the bent portion 30. This portion may be used as a stiffener so as to aid in preventing the structure from buckling.

As is apparent from the foregoing, the washing of the bent portion 30 conducts heat thereto and reduces the thermal difference across the metal of bent portion 30, which is exposed to cooling air at its outer surface and the heat from the combustor on the inner surface.

Lip 18 and the elbow 34 formed on the rear end of louver section 12 form an annular slot for the air passing over the fin in a double loop fashion to coalesce and discharge into the combustor in a film. This cooling air film is directed to adhere to the inner wall surface of louver 12 to shield the metal from the intense heat of the combustor and propagates downstream as far as possible as illustrated by the dashed line A. As noted, the portion 22 is tapered in cross section and serves to aid in increasing conduction into the supporting fin 20.

As is apparent from FIG. 2, the combustion or dilution air holes (since both types of holes has the same affect on the cooling film, only one will be described herein for the sake of convenience and simiplicity) generally indicated by reference numeral 50 serve to introduce radially air from the cavity surrounding the liner into the combustor as is well known in this art. Obviously, this radially flowing air impedes the flow of the cooling film generated by the double loop lip configuration as described above. As best seen in FIG. 2, according to this invention, this problem is solved by use of grommet 52 inserted in the hole 54 formed in the liner 12. The downstream side 56 of the grommet extends radially into the combustion zone to be spaced radially from the inside wall of the liner 12 and carries axially extending lip 58 that partly circumscribes the hole 54. As can best be seen in FIGS. 3 and 4, the upper surface of lip 58 (the portion facing liner 12) serves as an impingement plate for receiving cooler air through apertures 60 whereupon the impinged air is turned substantially 90° to flow along the lip surface and coalesce to form a cooling film adhering adjacent the inner surface of liner 12 to reform the cooling film originally formed by the double loop lip configuration. While the apertures 60 are shown as a drilled passage, slots 61 (as shown in FIG. 5) may also be utilized depending upon the particular application. These apertures in this embodiment are formed in the liner 12 for both the dilution and combustion air holes. As will be apparent from the foregoing, these apertures are located in the grommet itself, but it may be preferred in other embodiments to locate these apertures directly in the liner.

Referring now to FIG. 3, the grommet 56 is shown attached to the liner 12. The dilution or combustion air hole 72 is formed in the grommet 56 and as can be seen, it is located eccentric to the grommet centerline. This may be desirable in certain installations. The lip 58 may carry a pair of stiffening ribs 74 mounted on either end although in certain applications additional stiffening may be required. As can be seen from FIGS. 4 and 5, the admission holes for the impingement air may be drilled holes 60 or slots 61 depending on the particular installations.

It should be understood that the invention is not limited to the particular embodiments shown and described herein, but that various changes and modifications may be made without departing from the spirit and scope of this novel concept as defined by the following claims.

I claim:

1. For a gas turbine power plant, a combustor having a plurality of panels generally circular in shape and extending axially arranged end to end to define an annular combustion chamber, each of said panels having an inner surface subjected to combustion gases and an outer surface subjected to power plant cooler air, means on the downstream end to develop a film of a cool air flowing from said outer surface into said combustion chamber adjacent said inner surface, a plurality of openings in said panels for directing from said outer surface said cooler air to be used as combustion/dilution air radially into said combustion chamber passing through a portion of said film of cool air and obstructing the path of said portion, means for redefining the cooling film downstream of said openings relative to the flow of said combustion gases, a grommet supported to one of said panels having a generally circular body extending through each of said openings, a lip extending from the end of said grommet partially circumscribing said circular body on its downstream side relative to the flow of said combustion gases, said lip extending axially in said downstream direction and spaced from said inner surface, means for directly impinging said cool air from said outer surface onto said lip so that the impinged air is directed to flow adjacent said inner surface in said downstream direction, said lip having opposing said edges support means extending from said side edges to said circular body and defining with said lip an open ended channel, said channel being oriented with respect to said panels to orient the flow discharging from said lip in a given downstream direction.

2. For a gas turbine power plant as in claim 1 wherein said grommet includes a plurality of apertures overlying said lip for leading cool air from said outer surface to impinge on said lip.

3. For a gas turbine power plant as in claim 2 wherein said apertures are circular shaped holes.

4. For a gas turbine power plant as in claim 2 wherein said apertures are slots extending from one end of said grommet.

5. For a gas turbine power plant as in claim 1 wherein said means for impinging cool air includes apertures formed in said panels downstream of said grommet.

6. For a gas turbine power plant as in claim 5 where said apertures are circular shaped holes or slots.

* * * * *